United States Patent
Drouin et al.

(10) Patent No.: US 6,846,472 B2
(45) Date of Patent: Jan. 25, 2005

(54) PROCESS FOR TREATING GASEOUS EMISSIONS GENERATED DURING PRODUCTION OF CARBON ANODES IN AN ALUMINUM PLANT

(75) Inventors: Guy Drouin, Montreal (CA); Jean J. O. Gravel, Hull (CA)

(73) Assignee: Biothermica Technologies Inc., Montréal (CA)

( * ) Notice: Subject to any disclaimer, the term of this patent is extended or adjusted under 35 U.S.C. 154(b) by 283 days.

(21) Appl. No.: 10/270,620

(22) Filed: Oct. 16, 2002

(65) Prior Publication Data
US 2004/0076571 A1 Apr. 22, 2004

(51) Int. Cl.[7] .......................... B01D 53/10; B01D 53/68; B01D 53/44
(52) U.S. Cl. ................. 423/240 S; 423/245.1; 423/245.3; 423/210; 95/131; 588/205; 588/228
(58) Field of Search .................. 423/240 R, 240 S, 423/245.1, 245.3, 210; 95/131; 588/205, 228, 230

(56) References Cited

U.S. PATENT DOCUMENTS

| | | | | |
|---|---|---|---|---|
| 3,977,846 A | * | 8/1976 | Russell et al. ................ 95/108 |
| 4,062,696 A | * | 12/1977 | Ducote ........................... 134/1 |
| 4,113,832 A | * | 9/1978 | Bell et al. ................ 423/240 R |
| 4,501,599 A | * | 2/1985 | Loukos ........................ 95/109 |
| 5,013,336 A | * | 5/1991 | Kempf et al. ............. 423/245.1 |
| 5,112,368 A | | 5/1992 | Gosselin ....................... 95/280 |
| 6,183,707 B1 | | 2/2001 | Gosselin et al. .......... 428/245.3 |

* cited by examiner

Primary Examiner—Ngoc-Yen Nguyen
(74) Attorney, Agent, or Firm—ROBIC

(57) ABSTRACT

A process for treating gaseous emissions generated during the production of carbon anodes in the aluminum industry. In this process, first gaseous emissions generated during green anode preparation are collected and preheated by direct contact with a stream of combustion gases. Second gaseous emissions generated during anode baking are also collected and mixed with the first gaseous emissions to form a gaseous emission mixture. Alumina powder is then injected into the so obtained mixture and the resulting mixture with the alumina injected therein is processed into a dry scrubber that is equipped with a bag filter and is operating at temperatures well above the saturation temperature of tars, so as to obtain a gaseous mixture partially purified and free of fluorides and particulates. The so obtained partially purified gaseous mixture is then processed into an oxidation furnace in order to destroy all the organic compounds contained therein.

3 Claims, 1 Drawing Sheet

PROCESS FOR TREATING GASEOUS EMISSIONS GENERATED DURING PRODUCTION OF CARBON ANODES IN AN ALUMINUM PLANT

FIELD OF THE INVENTION

The present invention relates to a process for treating gaseous emissions generated during production of carbon anodes in an aluminum plant.

BACKGROUND OF THE INVENTION

In the aluminum smelting industry, it is of common practice to produce "green" anodes by mixing petroleum coke, coal tar pitch and usually also buts of anodes recycled from the electrolysis cells. Such a mixing is carried out in pieces of equipment called "anode paste mixers". It is also of common practice to subject the green anodes to baking in an open or closed furnace.

During the production of the green anodes, fumes are emitted, which contain substantial amounts of heavy gaseous and liquid hydrocarbon vapors from the hot coal tar pitch together with carbon particulates from the petroleum coke and some fluorides from the anode buts.

To control such an emission of fumes, a method is presently being used, which comprises injecting coke dust in the fumes, collecting ducts to absorb the hydrocarbon liquids and vapors contained in the fumes, then filtrating the fumes by means of a bag filter to collect the coke dust, recycling the so collected coke dust to the anode paste mixers, and discharging the remaining fumes to the atmosphere. In this method, any gaseous fluorides present in the fumes are also discharged. Moreover, the coke dust handling and injection system together with the equipment used for recycling of the coke dust to the anode paste mixers, are costly in capital and maintenance.

During the baking of the anodes, the fumes formed in the anode baking furnaces are discharged from said furnaces at temperatures generally above the saturation temperature of the tars which are largely in the form of vapors. These fumes also contain appreciable amounts of fluoride vapors.

To control this other emission of fumes, another method is presently being used, which comprises the steps of dry scrubbing the fumes with powered alumina and recycling said alumina to the electrolysis cells. This is very effective to remove the fluorides, but the dry scrubbing step permits to remove only the hydrocarbons that are in a condensed state. Thus, cooling of the fumes by indirect exchange or by water injection before their filtration is necessary to protect the filter bags of synthetic cloth used for the scrubbing from over heating. Such favors the condensation of hydrocarbon vapors and their collection in the filter.

As it may be appreciated, the current method used for treating the fumes emitted by the anode baking furnaces is effective for removing the fluorides and the heavier fractions of the organic components contained in the fumes, but it does not prevent escape of much of the lighter fractions which contain toxic polyaromatic hydrocarbons (PAH).

SUMMARY OF THE INVENTION

The object of the present invention is to provide a process for treating the fumes emitted during the preparation of the green anodes together with those emitted during the baking of the carbon anodes used for aluminum electrolysis process, in order to remove substantially all of the particulates contained therein, as well as the fluorides and the organic compounds also contained therein, such as tar vapors and polyaromatic hydrocarbons (PAH).

In other words, the object of the invention is to provide a process aimed at the control of the gaseous emissions from both the green anode preparation equipment and the anode baking furnaces, which process permits to achieve virtually total destruction of the hydrocarbons and complete removal of the fluorides.

More specifically, the invention is thus directed to a process for treating gaseous emissions generated during the production of carbon anodes in the aluminum industry, comprising the steps of:

collecting first gaseous emissions generated during green anode preparation;

preheating said first gaseous emissions by direct contact with a stream of combustion gases so as to evaporate all liquid tar particulates contained in said first gaseous emissions;

collecting second gaseous emissions generated during anode baking;

mixing the first and second gaseous emissions to form a gaseous emission mixture;

injecting alumina powder into the gaseous emission mixture;

processing the gaseous emission mixture with the alumina powder injected therein into a dry scrubber that is equipped with a bag filter and is operating at temperatures well above the saturation temperature of tars, so as to obtain a partially purified gaseous mixture free of solid particulates and of gaseous fluorides; and processing the so obtained, partially purified gaseous mixture into an oxidation furnace in order to destroy all organic compounds contained therein.

Preferably, the oxidation furnace is a regenerative thermal oxidation furnace.

Preferably also, the process comprises the additional steps of:

recycling a stream of hot clean combustion gases obtained in the regenerative thermal oxidation furnace; and using the recycled stream for preheating the first gaseous emissions.

The invention and its advantages will be better understood upon reading the following non-restrictive detailed description of the invention, made with reference to the accompanying drawings.

DETAILED DESCRIPTION OF THE INVENTION

Figure 1:
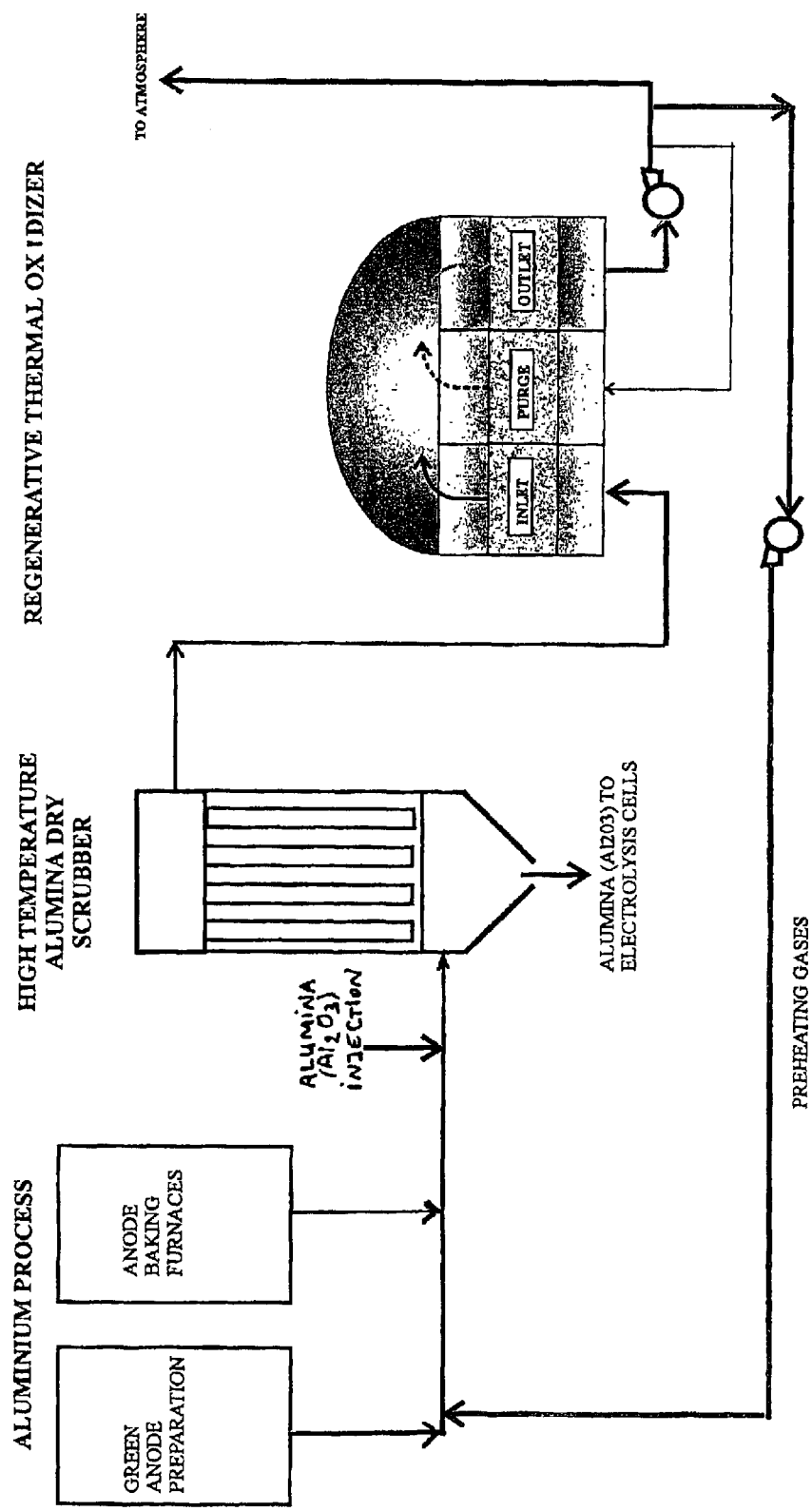
FIG. 1 is a schematic representation in the form of a flow chart of the process according to the invention as used in the aluminum industry.

As shown in FIG. 1, the process according to the invention comprises the step of collecting the gaseous emissions or "fumes" generated in the green anode preparation equipment (paste mixers) and preheating the so collected fumes by direct contact with a stream of hot clean combustion gases in order to maintain hydrocarbon tars in a gaseous state.

The process also comprises the step of collecting other gas emissions coming from the anode baking furnaces and mixing the so collected, other gas emission with those already collected and preheated.

The next step of the process comprises injecting alumina powder into the so obtained mixture and feeding the resulting mixtures to a bag filter which is capable of operating at temperatures well above the saturation temperature of the tars. As to the structure and operation of such a dry scrubber, reference can be made to U.S. Pat. No. 5,112,368 of 1992. This step removes the gaseous fluorides by adsorption on the alumina, together with the dry carbon particulates from the gas mixture.

Finally, the process comprises the step of feeding the so treated fumes to an oxidation furnace where all of the hydrocarbons are destroyed before discharging of the gases to the atmosphere. The fume oxidation carried out in the oxidation furnace is preferably a regenerative thermal oxidation as is described in U.S. Pat. No. 6,183,707 of 2001. Such a regenerative oxidation permits to achieve total destruction of the organic compounds, with a high thermal efficiency and minimum requirement for auxiliary fuel. The regenerative thermal oxidation also supplies a stream of hot clean combustion gases that may be recycled and used for preheating the green anode fumes as was disclosed hereinabove in order to insure their total volatilization during their collection and filtration.

As may be appreciated, the presence and use of a dry alumina scrubber capable of operating at a high temperature in combination with the presence and use of a thermal oxidation furnace preferably of the regenerative type, has numerous advantages, including:

a) elimination of a troublesome and costly coke filtration step;

b) removal and recovery of the fluoride emissions from both the green anode preparation and the anode baking equipments;

c) removal of the carbon particulates from both sources of emissions;

d) capture of all the hydrocarbon and tars from both sources of emission;

e) destruction by total oxidation all of the collected hydrocarbons and the toxic polyaromatic hydrocarbons;

f) volatilization of all the hydrocarbons and tars and recovering of their fuel value for use in the total oxidation step;

g) operation of the total oxidation step with minimal requirements for auxiliary fuel; and h) provision of a stream of hot combustion gases to preheat the gaseous emission from the green anode preparation equipment and thus the whole collection system.

What is claimed is:

1. A process for treating gaseous emissions generated during the production of carbon anodes in the aluminum industry, comprising the steps of:

collecting first gaseous emissions generated during green anode production;

preheating said first gaseous emissions by direct contact with a stream of combustion gases so as to evaporate all liquid tar particulates contained in said first gaseous emissions;

collecting second gaseous emissions generated during anode baking;

mixing said first and second gaseous emissions to form a gaseous emission mixture;

injecting alumina powder into said gaseous emission mixture;

processing the gaseous emission mixture with the alumina powder injected therein into an alumina dry scrubber that is equipped with a bag filter and is operating at temperatures well above the saturation temperature of tars, so as to obtain a partially purified gaseous mixture free of solid particulates and gaseous fluorides; and processing the so obtained, partially purified gaseous mixture into an oxidation furnace in order to destroy all organic compounds contained therein.

2. The process of claim 1, wherein the oxidation furnace is a regenerative thermal oxidation furnace.

3. The process of claim 2, comprising the additional steps of:

recycling a stream of hot clean combustion gases obtained in the regenerative thermal oxidation furnace; and using said recycled stream for preheating said first gaseous emissions.

* * * * *